US010965869B2

(12) United States Patent
Nabeshima (10) Patent No.: US 10,965,869 B2
(45) Date of Patent: Mar. 30, 2021

(54) IMAGE PICKUP APPARATUS FOR PERFORMING POWER SAVING FUNCTION AND CONTROL METHOD THEREFOR

(71) Applicant: CANON KABUSHIKI KAISHA, Tokyo (JP)

(72) Inventor: Rui Nabeshima, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/436,270

(22) Filed: Jun. 10, 2019

(65) Prior Publication Data

US 2019/0297273 A1   Sep. 26, 2019

Related U.S. Application Data

(62) Division of application No. 15/167,709, filed on May 27, 2016, now Pat. No. 10,432,858.

(30) Foreign Application Priority Data

Jun. 4, 2015   (JP) ................................ 2015-114265
Jun. 4, 2015   (JP) ................................ 2015-114266

(51) Int. Cl.
*H04N 5/232*   (2006.01)
*H04N 5/225*   (2006.01)
(Continued)

(52) U.S. Cl.
CPC ..... *H04N 5/232411* (2018.08); *G06F 1/3231* (2013.01); *G06F 1/3265* (2013.01);
(Continued)

(58) Field of Classification Search
CPC ......... H04N 5/232411; H04N 5/23203; H04N 5/23216; H04N 5/23219; H04N 5/23241;
(Continued)

(56) References Cited

U.S. PATENT DOCUMENTS 5,541,707 A *   7/1996   Sasagaki ................ G03B 17/18
                                                         396/287
8,078,045 B2 *  12/2011   Marcus .................. G03B 29/00
                                                          396/56
(Continued)

FOREIGN PATENT DOCUMENTS

CN    1414444 A    4/2003
CN   101610300 A   12/2009
(Continued)

*Primary Examiner* — Albert H Cutler
(74) *Attorney, Agent, or Firm* — Canon U.S.A., Inc. IP Division (57) ABSTRACT

An image pickup apparatus includes a display unit that changes a display direction to at least one of an image pickup direction of an image pickup unit or an opposite direction, a power saving unit that executes a power saving function of reducing power consumption in response to a period in which an operation from a user has not been accepted exceeding a threshold, and a control unit that performs control such that the threshold at a time when the display direction is the image pickup direction is set to be longer than the threshold at a time when the display direction is the opposite direction.

14 Claims, 6 Drawing Sheets

(51) Int. Cl.
*G06F 1/3231* (2019.01)
*G06F 1/3234* (2019.01)

(52) U.S. Cl.
CPC ..... *H04N 5/2252* (2013.01); *H04N 5/225251* (2018.08); *H04N 5/23203* (2013.01); *H04N 5/23216* (2013.01); *H04N 5/23219* (2013.01); *H04N 5/23241* (2013.01); *H04N 5/23293* (2013.01); *H04N 5/232935* (2018.08); *H04N 5/23212* (2013.01); *H04N 5/232127* (2018.08); *Y02D 10/00* (2018.01); *Y02D 30/50* (2020.08)

(58) Field of Classification Search
CPC ............ H04N 5/23293; H04N 5/2252; H04N 5/23212; H04N 5/232; H04N 5/225; H04N 5/23267; H04N 5/23245; H04N 5/2258; G06F 1/3231; G06F 1/3265; Y02D 10/153; Y02D 50/20; Y02D 10/173; G08B 13/19689
USPC ........ 348/211.99, 211.1, 211.4, 211.7, 211.8
See application file for complete search history.

(56) References Cited

U.S. PATENT DOCUMENTS

| | | | | |
|---|---|---|---|---|
| 8,085,310 | B2* | 12/2011 | Matsumoto | H04N 5/232 348/211.3 |
| 2003/0081142 | A1* | 5/2003 | Iijima | H04N 1/00885 348/372 |
| 2007/0159549 | A1* | 7/2007 | Matsumoto | H04N 5/23293 348/333.11 |
| 2009/0115880 | A1 | 5/2009 | Wada | |
| 2009/0244296 | A1* | 10/2009 | Petrescu | H04N 5/23293 348/207.99 |
| 2010/0313172 | A1 | 12/2010 | Hirahara | |
| 2014/0043498 | A1* | 2/2014 | Lee | H04N 5/23293 348/222.1 |
| 2015/0085157 | A1 | 3/2015 | Yamaguchi | |

FOREIGN PATENT DOCUMENTS

| | | |
|---|---|---|
| CN | 101697563 A | 4/2010 |
| CN | 101976109 A | 2/2011 |
| CN | 102055893 A | 5/2011 |
| JP | H01-114834 A | 5/1989 |
| JP | 2002-354335 A | 12/2002 |
| JP | 2003-131760 A | 5/2003 |
| JP | 2004-236287 A | 8/2004 |
| JP | 2006-325145 A | 11/2006 |
| JP | 2008-199107 A | 8/2008 |
| JP | 2009-117975 A | 5/2009 |
| JP | 2012-133524 A | 7/2012 |
| JP | 2013-229697 A | 11/2013 |
| JP | 2013-254007 A | 12/2013 |
| KR | 10-2006-0112079 A | 10/2006 |
| KR | 10-2010-0066968 A | 6/2010 |
| WO | 2015/025411 A | 2/2015 |

* cited by examiner

IMAGE PICKUP APPARATUS FOR PERFORMING POWER SAVING FUNCTION AND CONTROL METHOD THEREFOR

CROSS-REFERENCE TO RELATED APPLICATION

This application is a Divisional of U.S. application Ser. No. 15/167,709, filed May 27, 2016, which claims priority from of Japanese Patent Application No. 2015-114265, filed Jun. 4, 2015, and Japanese Patent Application No. 2015-114266, filed Jun. 4, 2015, which are hereby incorporated by reference herein in their entireties.

BACKGROUND

Field

Aspects of the present invention generally relate to a switching control technology for a power saving state and a non-power saving state.

Description of the Related Art

Up to now, to reduce power consumption of an apparatus, a technology has been proposed for performing an auto power-off operation when a state in which no operation has been performed on the apparatus continues for a predetermined time or longer to shift the state into a power saving state. To avoid the auto power-off operation while the non-operation state continues for the predetermined time or longer when the shooting is performed by an audio input, Japanese Patent Laid-Open No. 2002-354335 describes a configuration in which the auto power-off operation is not performed in a case where a mode of performing shooting based on an audio trigger shooting function is set. Furthermore, in order that the auto power-off operation is performed at an appropriate time intended by a user, Japanese Patent Laid-Open No. 2003-131760 describes a configuration in which a time until the auto power-off operation is performed is set in response to a method of turning on a power supply.

In recent years, a shooting method called self-shooting has been spread in which a subject itself is a photographer and performs the shooting. In the self-shooting, for example, a display unit is inverted with respect to a main body unit, and an angle, an expression, and the like are checked while the subject on the display unit is checked to perform the shooting. For this reason, a time for a shooting preparation in which the operation is not performed until issuance of a shooting instruction is lengthened, and the state is shifted to the power saving state in some cases because of the auto power-off operation or the like even when the user still performs the shooting preparation. According to a method described in Japanese Patent Laid-Open No. 2002-354335, in the self-shooting without using the audio trigger shooting function, it is likely that the auto power-off operation is performed during the shooting preparation of the self-shooting as described above. Furthermore, according to a method described in Japanese Patent Laid-Open No. 2003-131760, since the self-shooting is performed irrespective of the method of turning on the power supply, there is a possibility that the auto power-off operation may be executed even when the shooting preparation is being performed as described above.

Up to now, an electronic device has been proposed in which a state is shifted to a power saving state where power consumption is reduced in a case where an operation has not been performed for a predetermined time, and the state is returned from the power saving state in a case where an operation is accepted from a user. Japanese Patent Laid-Open No. 2008-199107 proposes a configuration in which, when a power supply off state is switched to an operation state by a sensor operation switching member, the power supply is turned on by a touch operation on a touch panel. Meanwhile, Japanese Patent Laid-Open No. 2013-254007 proposes a configuration in which a shooting operation is performed by the touch operation on the display unit in a state in which the display unit is inverted towards an image pickup direction side.

On the other hand, in recent years, the number of cameras provided with a touch panel that can accept the touch operation on its back face has been increased, and in a case where the user walks while wearing the camera around the neck or the like, the body of the user may contact the touch panel, and an unintended function may be executed in some cases. In addition, as described in Japanese Patent Laid-Open No. 2008-199107, if the power supply is turned on from the off state by the touch operation, when the user walks while wearing the camera around the neck or the like, the body of the user may contact the touch panel, and the power supply may be turned on in some cases. In this manner, when the power supply is turned on in response to the touch operation, if the body of the user or the like touches the touch panel, an unintended operation may be performed in some cases to cause an undesirable result. Meanwhile, as described in Japanese Patent Laid-Open No. 2013-254007, when the shooting is performed while the display unit is inverted, the user is likely to be situated on an image pickup side (front face side) of the camera, and it is facilitated to perform the touch operation on the display unit, but it is difficult to operate an operating member on the back face of the camera.

SUMMARY

Aspects of the present invention have been made in view of the above-described issues and provide an image pickup apparatus that can appropriately set a time until a state is shifted to a power saving state in response to a use state or the like of a shooting apparatus such as self-shooting.

In addition, aspects of the present invention have been made in view of the above-described issues and provide an image pickup apparatus that can switch, for example, on and off of a display unit such as a touch panel at a satisfactory operability.

According to an aspect of the present invention, there is provided an image pickup apparatus including an accepting unit configured to accept an operation from a user, a display unit that selectively changes a display direction to one of an image pickup direction of an image pickup unit or an opposite direction, a power saving unit configured to execute a power saving function of reducing power consumption in response to a period in which the accepting unit has not accepted the operation from the user exceeding a threshold, and a control unit configured to perform control such that the threshold in a case where the display direction of the display unit is the image pickup direction is set to be longer than the threshold in a case where the display direction of the display unit is the opposite direction.

Further features of aspects of the present invention will become apparent from the following description of exemplary embodiments with reference to the attached drawings.

DESCRIPTION OF THE EMBODIMENTS

An exemplary embodiment of the present invention will be described in detail below with reference to the accompanying drawings.

It is to be noted that the following exemplary embodiment is merely one example for implementing the aspects of the present invention and can be appropriately modified or changed depending on individual constructions and various conditions of apparatuses to which the aspects of the present invention are applied. Thus, aspects of the present invention are in no way limited to the following exemplary embodiments.

Hereinafter, exemplary embodiments of the present invention will be described with reference to the drawings.

First Exemplary Embodiment

FIGS. 1A to 1D illustrate an external appearance of a digital camera 100 as an example of an image pickup control apparatus according to an exemplary embodiment of the present invention.

Figure 1A:
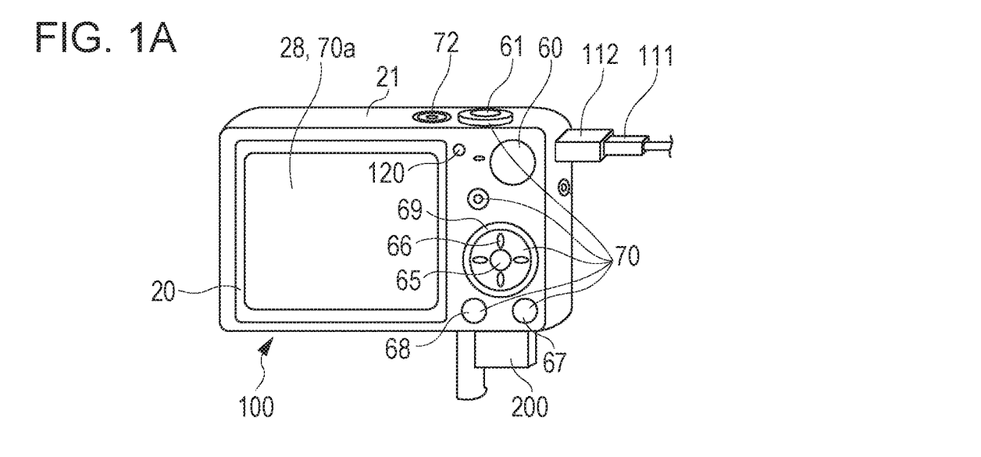
FIGS. 1A to 1D illustrate an external appearance of a digital camera as an example of an apparatus to which a configuration according to the present exemplary embodiment can be applied.
Figure 1B:
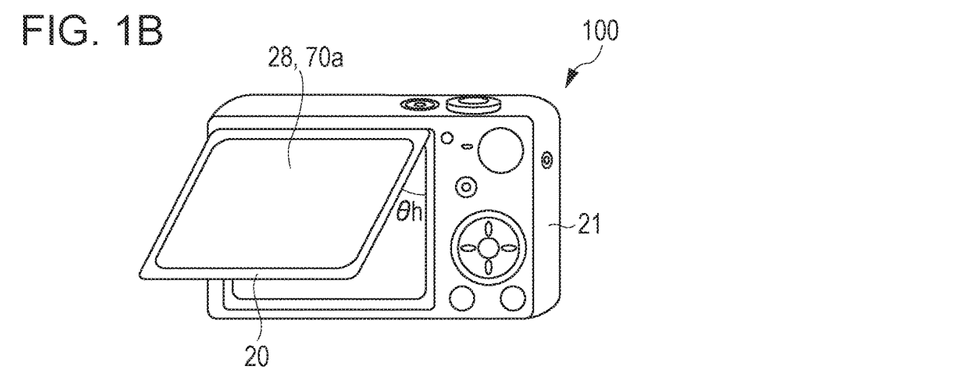
Figure 1C:
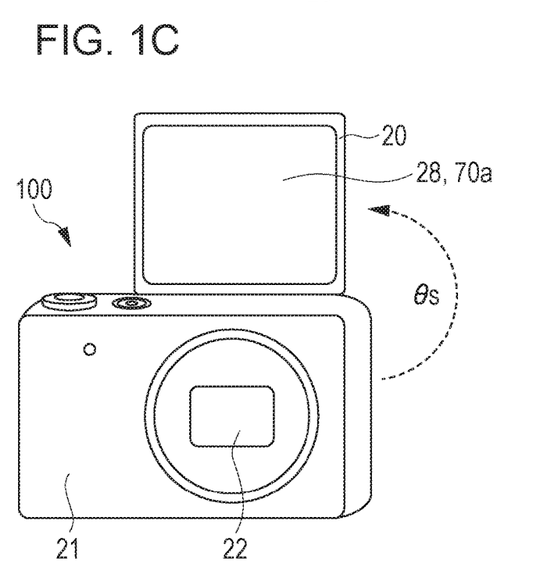

The digital camera 100 is constituted by a main body unit 21 and the monitor unit 20, and the monitor unit 20 is rotatable (its position can be changed) within a predetermined range with respect to the main body unit 21. Thus, a user can selectively change a display direction of a display unit 28. FIG. 1A illustrates a state in which the monitor unit 20 is stored in the main body unit 21, and a rotation angle θ=0 is set. FIG. 1B illustrates a case where the monitor unit 20 is rotated by the rotation angle θ=θh with respect to the main body unit 21, but the display unit 28 and an image pickup unit 22 face in opposite directions to each other so that the display unit 28 is not checked from the user situated on the side of the image pickup unit 22. FIG. 10 illustrates a case where the monitor unit 20 is rotated by the rotation angle θ=θs (>θh) with respect to the main body unit 21, and the display unit 28 and the image pickup unit 22 face in the same direction so that the display unit 28 can be checked from the user situated on the side of the image pickup unit 22.

Figure 1D:
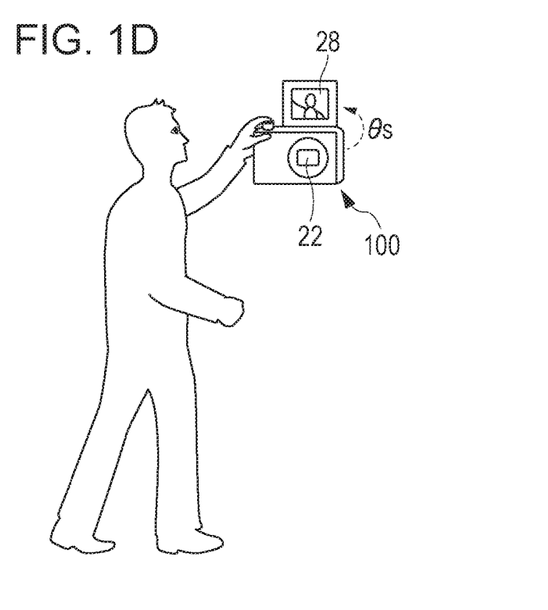

FIG. 1D illustrates an example of a situation where the user performs self-shooting (self-photographing), and the photographer (subject) is displayed on the display unit 28 (live view display). In the above-described case, when the display unit 28 is inverted as illustrated in FIG. 10, the photographer itself (subject itself) can perform the shooting while observing the display of the display unit 28. The display unit 28 is a display unit that displays an image or various information, and a touch panel 70a is provided while being overlapped with the display unit 28. A self-shooting mode (also referred to as a self-photographing mode, a self-portrait mode, a selfie mode, or the like) is a shooting mode appropriate to shoot a human figure subject more beautifully. In the self-shooting mode, with respect to a detected main face, an effect to make the skin beautiful (skin-beautifying effect) can be applied to the face of the photographer (subject) itself, a luminance can be adjusted, or the background can be blurred to make the human face look well. A small face effect that is an effect to make the human face small, a large eye effect, a slender looking effect or the like may be applied to the face. In addition, in the self-shooting mode, face autofocus (AF) to focus on a human face area can be performed, and face AE, face FE, and face WB can also be performed at the same time with the face AF. The face AE is a process to optimize exposure of an entire screen in accordance with a luminance of the detected face. The face FE is a process to control flash light while the detected face is set as a center. The face WB is a process to optimize a white balance of the entire screen in accordance with a color of the detected face. The skin-beautifying effect is an effect to smooth the skin and make the skin beautiful in response to a skin-beautifying intensity. In skin-beautifying processing adopting the skin-beautifying effect, when the face is detected, a range including the eyes, nose, and mouth is detected to obtain values of YUV in the detected range. The calculated Y is suppressed to smooth a skin area so that it is possible to make a wrinkle or the like inconspicuous (unevenness such as the wrinkle is blurred). In addition, the values of UV are averaged, and a skin part is coated with an averaged color so that color shading of the skin is reduced.

A shutter button 61 is an operation unit configured to issue a shooting instruction. A mode switching switch 60 is an operation unit configured to switch various modes. A connector 112 is, for example, a connector for connecting a connection cable 111 to be connected to a personal computer (PC) or a printer to the digital camera 100. A power switch 72 is a push button for switching power ON and power OFF. A recording medium 200 is a non-volatile recording medium such as a memory card or a hard disc drive. An operation unit 70 is an operation unit constituted by operating members such as various switches, button, touch panel, and the like for accepting various operations from the user. Functions are appropriately allocated to the respective operating members of the operation unit 70 for each scene when various function icons displayed on the display unit 28 are selected and operated, for example, and the respective operating members of the operation unit 70 act as various function buttons. The function buttons include, for example, a set button 65, a cross key 66, a menu button 67, a live view button 68, a dial 69, and the like. For example, when the menu button 67 is pressed, a menu screen with which various setting can be made is displayed on the display unit 28. The user can intuitively perform various settings by using the menu screen displayed on the display unit 28 and also a four-way button for up, down, left, and right of the cross key 66 and the set button 65. Change of a selected item and the like of can be also performed (accepted) in response to an operation amount by a rotating operation on the dial 69. A remote control reception unit 120 is a communication unit configured to accept an instruction (operation instruction) such as a shooting instruction from a communication apparatus such as a remote controller. The operation instruction such as the shooting instruction may be set to accept both an instruction by the remote controller (remote control mode)

and an instruction by a member other than the remote controller (non-remote control mode) or either one of the instructions.

Figure 2:
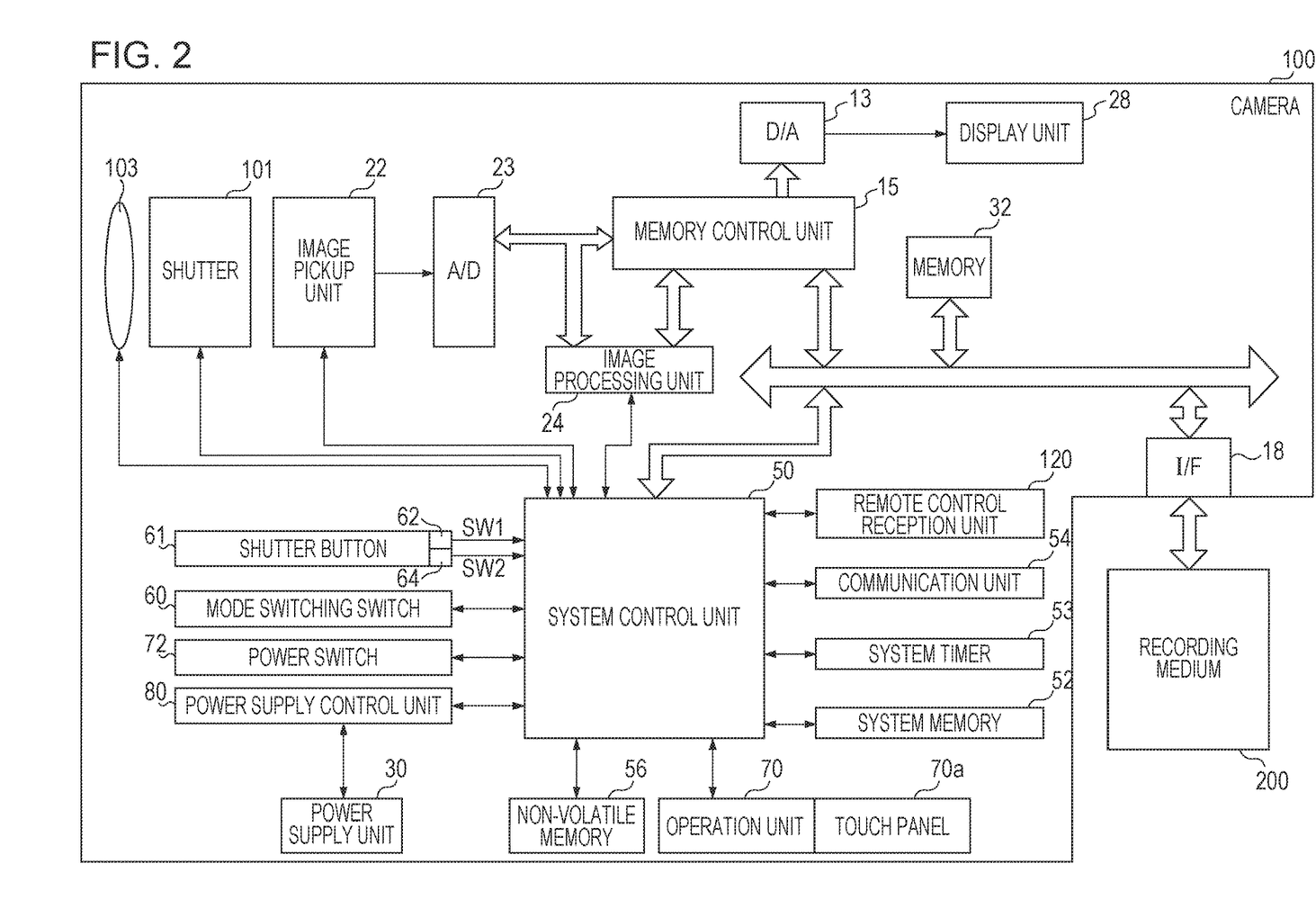
FIG. 2 is a block diagram illustrating a configuration example of the digital camera as the example of the apparatus to which the configuration according to the present exemplary embodiment can be applied.

FIG. 2 is a block diagram illustrating a configuration example of the digital camera 100 according to the present exemplary embodiment.

In FIG. 2, a shooting lens 103 is a lens group including a zoom lens and a focus lens. A shutter 101 is a shutter provided with an aperture function. The image pickup unit 22 is an image pickup element constituted by a charge-coupled device (CCD) configured to convert an optical image into an electric signal, a complementary metal-oxide semiconductor (CMOS), or the like. An analog-to-digital (A/D) converter 23 converts an analog signal into a digital signal. The A/D converter 23 is used to convert an analog signal output from the image pickup unit 22 into a digital signal.

An image processing unit 24 performs resizing processing such as predetermined pixel interpolation or reduction or color conversion processing on data from the A/D converter 23 or data from a memory control unit 15.

The output data from the A/D converter 23 is directly written in a memory 32 via the image processing unit 24 and the memory control unit 15 or via the memory control unit 15. The memory 32 stores the image data obtained by the image pickup unit 22 and converted as the digital data by the A/D converter 23 or image data to be displayed on the display unit 28. The memory 32 is provided with a sufficient recording capacity for storing a predetermined number of still images or video and audio for a predetermined time.

The memory 32 also functions as a memory (video memory) for displaying an image. A digital-to-analog (D/A) converter 13 converts the data for the image display which is stored in the memory 32 into an analog signal to be supplied to the display unit 28. In this manner, the image data for the display which is written in the memory 32 is displayed by the display unit 28 via the D/A converter 13. The display unit 28 performs the display in accordance with the analog signal from the D/A converter 13 on a display such as a liquid crystal display (LCD). The digital signal that has been once subjected to the A/D conversion by the A/D converter 23 and accumulated in the memory 32 is subjected to the analog conversion by the D/A converter 13 and sequentially transferred to the display unit 28 to be displayed, so that the display unit 28 functions as an electronic viewfinder, and live view image display (live view display) can be performed.

A non-volatile memory 56 is a memory as a recording medium where deletion and recording can be electrically performed, and an EEPROM or the like is used as the non-volatile memory 56, for example. The non-volatile memory 56 stores a constant for an operation of a system control unit 50, a program, or the like. The program mentioned herein refers to a computer program for executing various flow charts which will be described below according to the present exemplary embodiment.

The system control unit 50 controls the entirety of the digital camera 100. While the above-described program recorded in the non-volatile memory 56 is executed, respective processings that will be described below according to the present exemplary embodiment are realized. A RAM is used as a system memory 52. The constant for the operation of the system control unit 50, a variable, the program read out from the non-volatile memory 56, or the like is expanded into the system memory 52. The system control unit 50 also performs display control by controlling the memory 32, the D/A converter 13, the display unit 28, or the like. The system control unit 50 can also detect a position of the monitor unit 20 with respect to the main body unit 21. A method of detecting the position of the monitor unit 20 includes a method of detecting an input state of a switch that is physically switched in response to a movement of the monitor unit 20 and detecting whether or not the monitor unit 20 is in a state open from a predetermined position (angle). As an alternative to the above, the position of the monitor unit 20 may be electrically calculated. While the position of the monitor unit 20 is detected as described above, it is possible to determine whether or not the monitor unit 20 is inverted with respect to the main body unit 21 (the display direction faces in the same direction as the image pickup unit 22).

A system timer 53 is a timer unit configured to measure a time used for various controls and a time of a built-in clock.

The operation unit 70 such as the mode switching switch 60 and the shutter button 61 is an operation unit configured to input various operation instructions to the system control unit 50. A first shutter switch 62 is turned on in mid-course of the operation of the shutter button 61 provided to the digital camera 100, which is so-called half press (shooting preparation instruction), to generate a first shutter switch signal SW1. Operations such as autofocus (AF) processing, auto exposure (AE) processing, auto white balance (AWB) processing, flash pre-light emission (EF) processing, and the like are started by the first shutter switch signal SW1.

A second shutter switch 64 is turned on upon the completion of the operation of the shutter button 61, which is so-called full press (shooting instruction), to generate a second shutter switch signal SW2. The system control unit 50 starts operations of a series of shooting processings from readout processing of the signal from the image pickup unit 22 until writing processing of the image data in the recording medium 200 by the second shutter switch signal SW2.

A power supply control unit 80 is constituted by a battery detection circuit, a DC-DC converter, a switch circuit configured to switch a block to be distributed with power, and the like and detects whether or not a battery is mounted, a type of the battery, and a remaining amount of the battery. In addition, the power supply control unit 80 controls the DC-DC converter on the basis of the detection results and the instructions of the system control unit 50 and supplies necessary voltages to the respective units including the recording medium 200 for a necessary period.

A power supply unit 30 is constituted by a primary battery such as alkaline battery or lithium battery, a secondary battery such as NiCd battery, NiMH battery, or Li battery, an AC adapter, or the like. The power switch 72 accepts ON and OFF operations of the power supply from the user to be transmitted to the system control unit 50.

A recording medium I/F 18 is an interface such as a memory card or a hard disc drive with the recording medium 200. The recording medium 200 is a non-volatile recording medium such as the memory card for recording the shot image and is constituted by a semiconductor memory, an optical disc, a magnetic disc, or the like.

A communication unit 54 is connected to an external device or a network via a wireless or wired cable and performs transmission and reception of a video signal, an audio signal, or the like. The communication unit 54 can also be connected to a wireless local area network (LAN) or the internet. The communication unit 54 can transmit the image (live view image) picked up by the image pickup unit 22 or the image recorded in the recording medium 200 and can also receive the image data and other various information from the external device.

The remote control reception unit 120 receives a remote control key from an infrared remote controller. The remote control reception unit 120 can remotely accept an instruction of the shooting start by way of the remote control (remote control mode). The remote control reception unit 120 receives the instruction such as the shooting instruction from the external communication device even in a case where the connector 112 is set to receive the signal of the external communication device.

It should be noted that the touch panel 70a that can detect a contact on the display unit 28 (touch detection) is provided as one member of the operation unit 70. The touch panel and the display unit 28 can be integrally constituted with each other. For example, the touch panel is constituted such that a transmittance of light does not disturb the display of the display unit 28 and attached onto an upper layer of a display surface of the display unit 28. Input coordinates on the touch panel are associated with display coordinates on the display unit 28. Accordingly, a graphical user interface (GUI) can be constituted as if the user can directly operate the screen displayed on the display unit 28. The system control unit 50 can detect the following operations or states of the touch panel.

A state in which a finger or a pen that has not been touching the touch panel newly touches the touch panel. That is, the state means the start of the touch (hereinafter, will be referred to as Touch-Down).

A state in which the finger or the pen is touching the touch panel (hereinafter, will be referred to as Touch-On).

A state in which movement is made while the finger or the pen is touching the touch panel (hereinafter, will be referred to as Touch-Move).

A state in which the finger or the pen that has been touching the touch panel is released. That is, the state means the end of the touch (hereinafter, will be referred to as Touch-Up).

A state in which nothing touches the touch panel (hereinafter, will be referred to as Touch-Off).

When Touch-Down is detected, the state of Touch-On is also detected at the same time. After Touch-Down, unless Touch-Up is detected, the detection of Touch-On normally continues. After Touch-Up of all of the fingers or pens that have been touching the touch panel is detected, the state of Touch-Off is established.

The system control unit 50 is notified of these operations and states and also the positional coordinates at which the finger or the pen touches the touch panel via an internal bus. The system control unit 50 determines which operation has been performed on the touch panel on the basis of the notified information. Any method may be used for the touch panel among touch panels based on various methods including a resistive film method, an electrostatic capacitance method, a surface acoustic wave method, an infrared method, an electromagnetic induction method, an image recognition method, an optical sensor method, and the like. A method of detecting a touch when a contact on the touch panel exists and a method of detecting a touch even when no contact is made if the finger or the pen is close to the touch panel are proposed among the methods, and either method may be adopted.

Next, power saving of the display unit 28 that can be set in the digital camera 100 and a light-off function for preventing an erroneous touch will be described.

In a case where a power saving setting is set as ON, the power saving state is established in which the luminance of the display unit 28 is reduced or light is turned off (display off) (execution of a power saving function) in response to a predetermined operation (operation to prevent the shift to a power saving state or an erroneous touch preventing state) not being performed for a predetermined time. Similarly, in a case where an operation from the user has not been performed for a predetermined time, the state may be shifted to an erroneous operation preventing state in which the touch operation or the like is not accepted in some cases to mainly prevent the erroneous operation by the touch operation unintended by the user. For example, when the operation of the operation unit 70 from the user has not been performed for a predetermined time, the state is determined in which the user does not intend to perform the operation, and the luminance may be preferably reduced, or no display may be preferably performed instead of the display in which the luminance of the display unit 28 is set as a normal luminance at a high visibility. When the power saving function is executed on the display unit 28 in the above-described manner, no unnecessary power is consumed, and power saving can be realized.

In addition, when the touch on the touch panel 70a from the user has not been performed for a predetermined time or longer, it is determined that the user does not intend to touch the touch screen, light of the display unit 28 is turned off. At this time, since the corresponding function is not executed in response to the touch performed on the touch panel, the function is not executed by the touch unintended by the user. When the touch on the touch panel 70a from the user has not been performed for the predetermined time or longer, for example, a state is assumed in which the user wears the digital camera 100 around the neck or shoulder and does not intend to touch. Thus, if the light of the display unit 28 is turned off and the operation is not performed in response to the touch operation, the function such as the change of the item by the touch unintended by the user is unlikely to be executed.

To abort the power saving state and the erroneous touch preventing state to return to the original state or to extend the time until the state is shifted to the power saving state and the erroneous touch preventing state, a predetermined operation such as press of a button or the touch operation may be performed.

On the other hand, as described above, shooting is generally performed after a shooting angle of the photographer itself, an expression, and the like are checked in the self-shooting. It takes time to perform the operation of the shooting instruction in many cases, and a state often continues in which the operation is not performed until the shooting instruction is issued. In mid-course of the shooting preparation of the above-described self-shooting, if the photographer (operator) performs the operation a number of times in order that the state does not enter the power saving state and the erroneous operation preventing state (or, the state returns to the normal state after the state has entered the power saving state), the shooting preparation is interrupted, which is an unwanted situation. In addition, in order that the state does not enter the power saving state, if the shooting instruction is issued a number of times even during the shooting preparation, the shooting is performed each time the shooting instruction is issued, and images undesired for the user are recorded.

In the shooting such as the self-shooting, the shooting is performed in a state in which the display unit 28 is inverted while the digital camera 100 is held in many cases. In particular, in the above-described case, it is difficult to perform an operation on a member (operating member on a side where the cross key 66 and the like are arranged) on the opposite side to the side where the user exists (image pickup unit side). If the photographer (operator) performs the operation a number of times by changing its posture such that the state returns to the normal state from the power saving state and the erroneous operation preventing state, the finally determined angle, expression, and the like may be changed, which is an unwanted situation. Furthermore, in recent years, the self-shooting has been performed by issuing the shooting instruction via a communication while the image pickup apparatus is attached to a tip of a long stick or the like in some cases. To directly operate the operation unit 70 or the like of the digital camera 100 in a case where the digital camera 100 exists beyond the reach of the user, the shooting preparation needs to be interrupted once.

With reference to FIGS. 3A to 3C and FIGS. 4A to 4C, descriptions will be given of processing of shifting the state to the power saving state and the erroneous touch preventing state in a case where the display unit 28 and the touch panel 70a are inverted as described above.

Figure 3A:
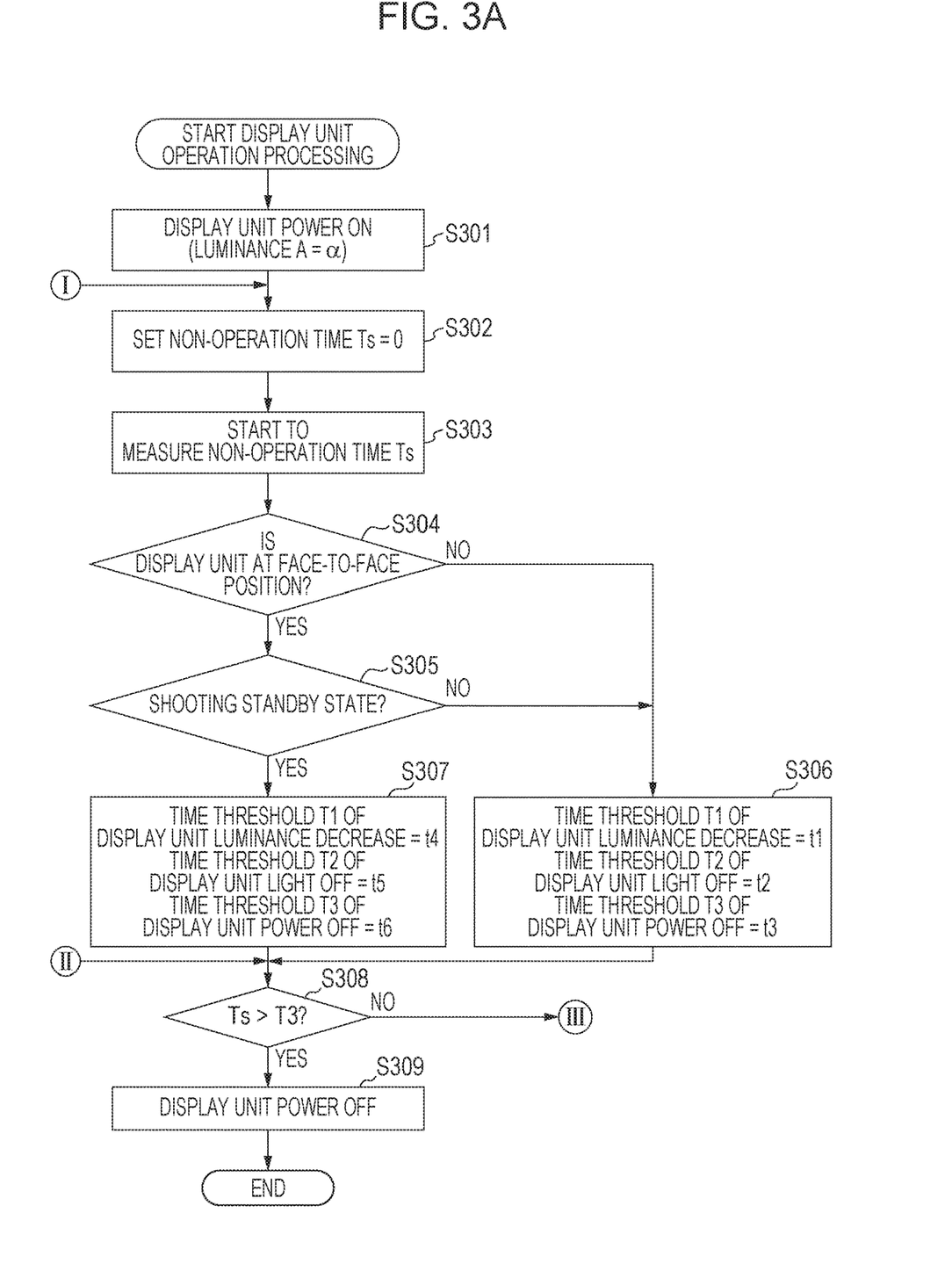
FIGS. 3A to 3C illustrate power saving processing of a display unit according to the present exemplary embodiment.
Figure 3B:
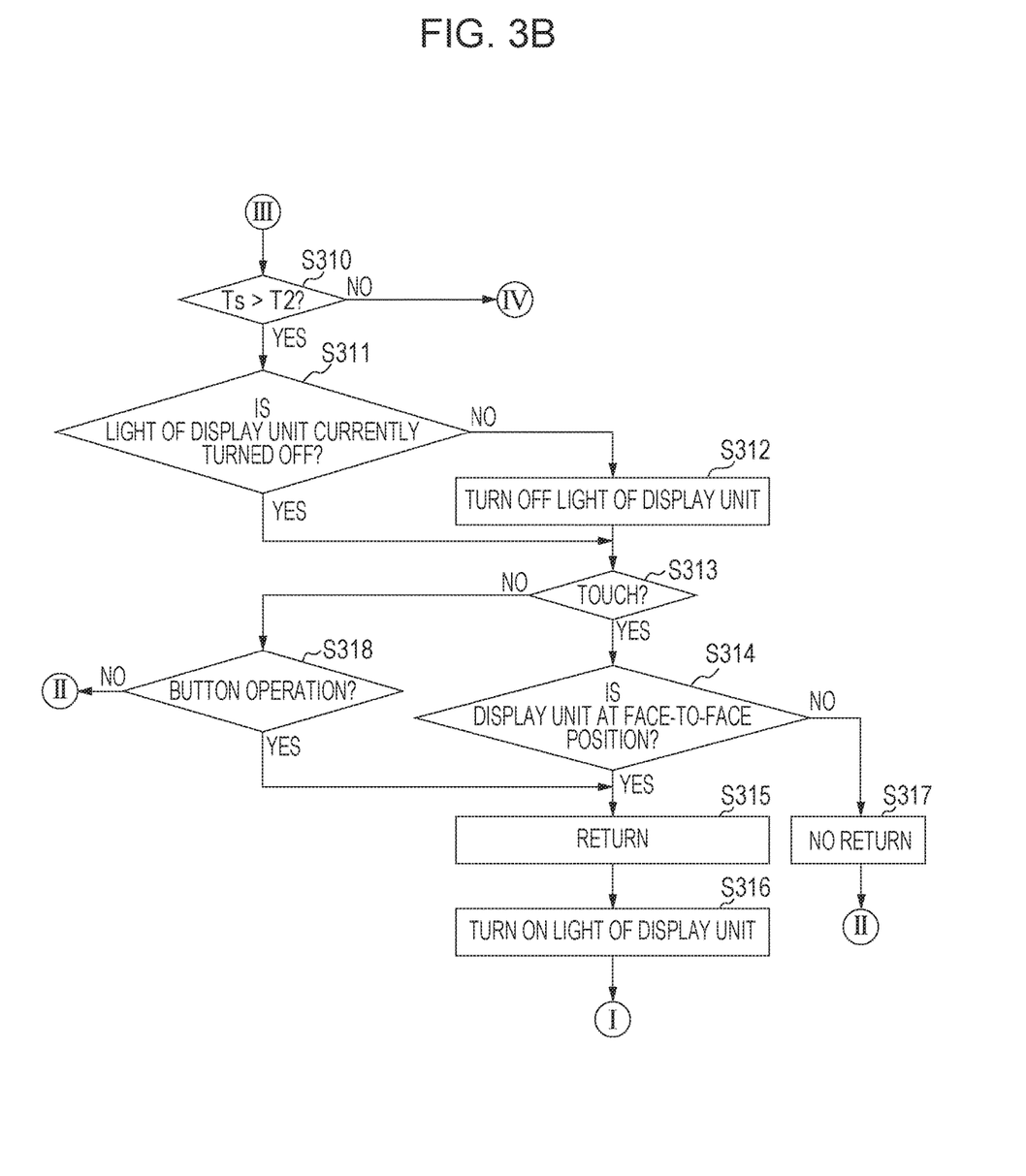
Figure 3C:
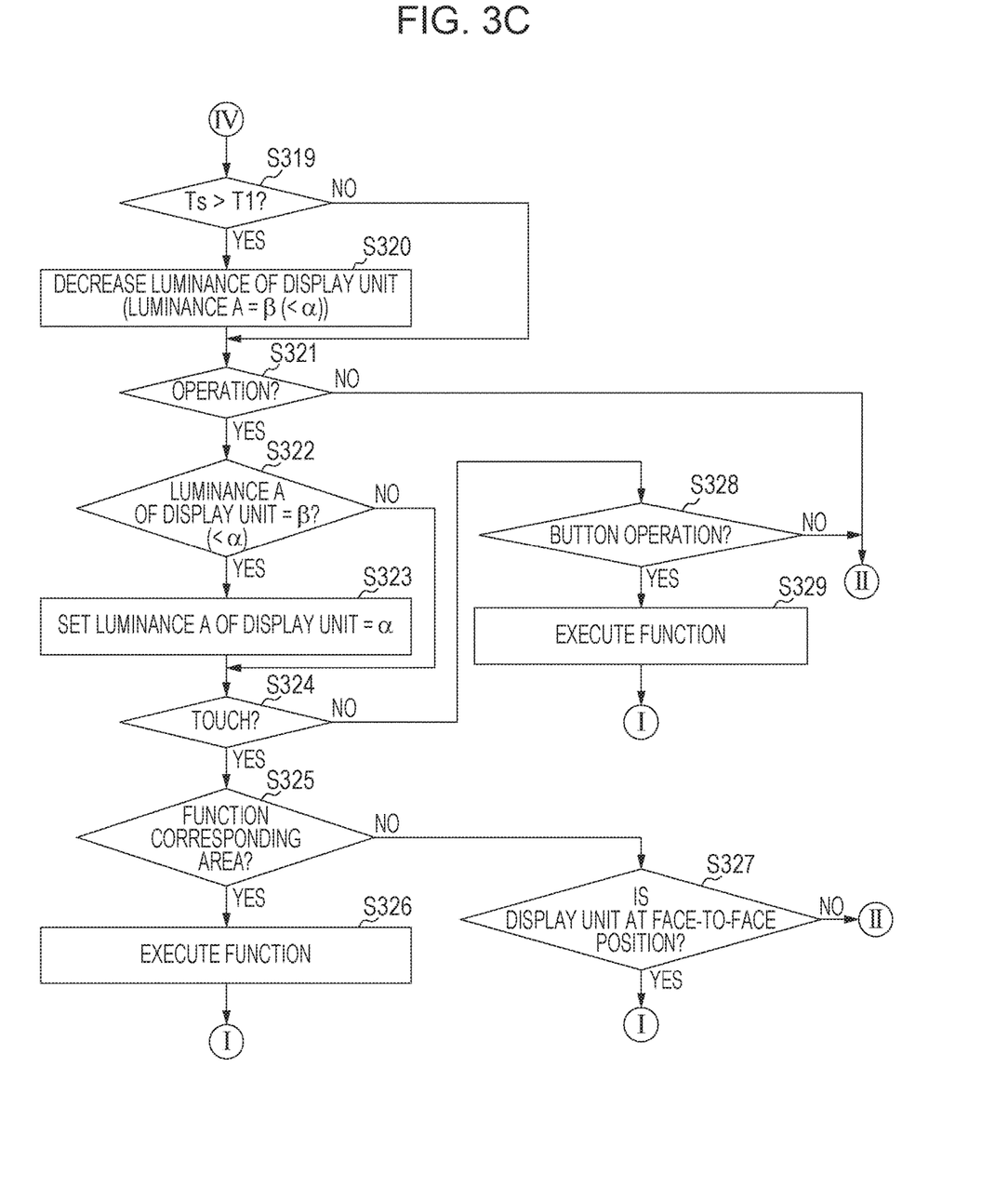

Display unit operation processing according to the present exemplary embodiment will be described with reference to FIGS. 3A to 3C. The present exemplary embodiment relates to a configuration in which the luminance of the display unit 28 is decreased, the light of the display unit 28 is turned off, or the power supply is turned off in a case where the operation of the user has not been performed for a predetermined time or longer. It should be noted that this processing is started when the power supply of the digital camera 100 is turned on, and the display of the display unit 28 can be performed. This processing is realized while the program recorded in the non-volatile memory 56 is expanded into the system memory 52 and executed by the system control unit 50.

Figure 4A:
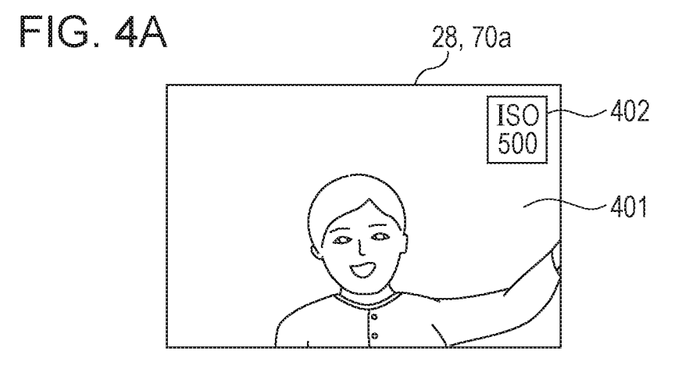
FIGS. 4A to 4C illustrate display examples of the display unit according to the present exemplary embodiment.
Figure 4B:
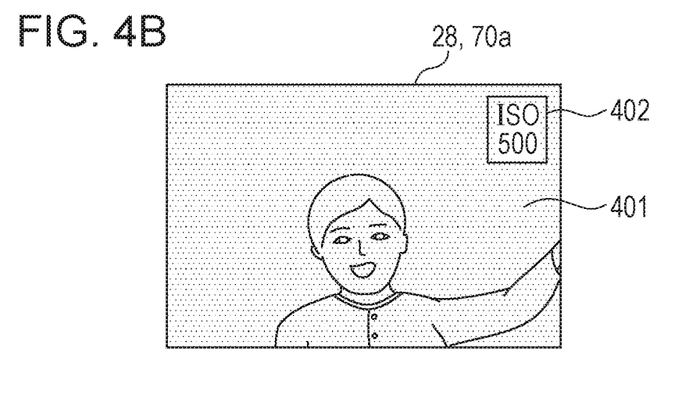
Figure 4C:
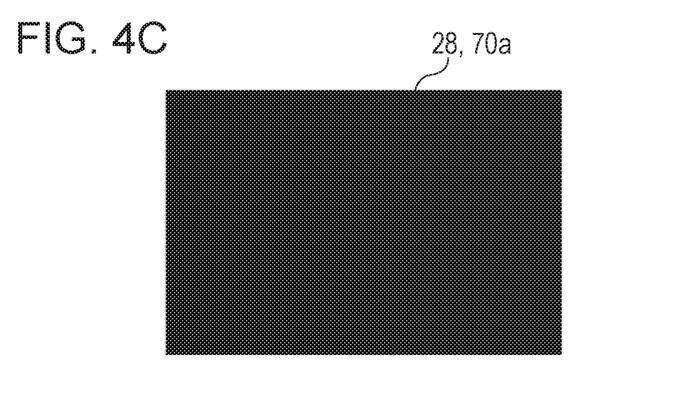

In S301, the system control unit 50 turns on the power supply of the display unit 28 and sets a luminance corresponding to an index of a luminance of the display unit 28 as a luminance A=α. The luminance A=α is set as a luminance in a normal state corresponding to a state that is not the power saving state. FIGS. 4A to 4C illustrate examples of the display unit 28 in the case of the normal state, the power saving state, and the light-off state. FIG. 4A corresponds to the normal state displayed at a high luminance so that a visibility of a live view image 401 is increased.

In S302, the system control unit 50 sets a non-operation time Ts=0. In a case where the non-operation time Ts exceeds a time threshold, the light of the display unit 28 is turned off from the normal state, and the state is shifted to a state in which a function in accordance with the power saving state or the touch operation is not executed (touch acceptance OFF). The non-operation time Ts normally indicates a time in a non-operation state in which the user does not perform the operation and an elapsed time since the operation is lastly detected.

In S303, the system control unit 50 starts the measurement of the non-operation time Ts to count up.

In S304, the system control unit 50 determines whether or not the direction of the display unit 28 and the touch panel 70a (the monitor unit 20) corresponds to a face-to-face position. The face-to-face position indicates a case where the display surface of the display unit 28 faces in the same direction as that of the image pickup unit 22 as in the rotation angle θ=θs of the monitor unit 20 illustrated in FIG. 10. In a case where the user sets the face-to-face position, for example, it is supposed that the subject existing on the image pickup unit 22 side in the self-shooting mode or the like intends to perform the shooting while checking a situation where the subject is being picked up by the image pickup unit 22 by observing the display unit 28. In a case where the face-to-face position is determined, the flow proceeds to S305, and in a case where the face-to-face position is not determined, the flow proceeds to S306.

In S305, the system control unit 50 determines whether or not the digital camera 100 is in a shooting standby state. The shooting standby state refers to a state (display state) in which the live view image (live view) picked up by the image pickup unit 22 is displayed on the display unit 28 instead of a reproduction image or the menu screen. In a case where the shooting standby state is determined, the flow proceeds to S307, and in a case where the shooting standby state is not determined, the flow proceeds to S306.

In S306, the system control unit 50 sets a time threshold until the luminance of the display unit 28 is decreased, a time threshold until the light of the display unit 28 is turned off, and a time threshold until the power supply is turned off in a case where the display unit 28 is not at the face-to-face position or a case where the display unit 28 is the face-to-face position but the state is not the shooting standby state (during the live view image display). In a case where the user has not performed the operation for the set time threshold or longer, it is assumed that the user no longer performs the operation, and the luminance of the display unit 28 is decreased, or the light is turned off, but if the power supply of the display unit 28 is not turned OFF, the state is returned (the luminance is increased, or the light is turned on) in response to a predetermined operation being performed. On the other hand, in a case where the power supply of the digital camera 100 is turned off, the display on the display unit 28 is not performed unless the power switch 72 is pressed to turn on the power supply. A time threshold T1 until the luminance is decreased is set as t1, a time threshold T2 until the light of the display unit 28 is turned off is set as t2, and a time threshold T3 until the power supply of the digital camera 100 is turned off is set as t3. Values set as the time thresholds T1 to T3 are set to have a relationship of t1<t2<t3. Examples of the setting of (t1, t2, t3) include (10 seconds, 20 seconds, 30 seconds) and (15 seconds, 30 seconds, 60 seconds). When the setting is made as described above, before the power supply of the display unit 28 is turned off, the luminance of the display unit 28 is decreased, and next, the light of the display unit 28 is turned off. Therefore, the power supply of the digital camera 100 is not suddenly turned off, and the user is hardly confused as to why the power supply is turned off.

In S307, the system control unit 50 sets a time threshold until the luminance of the display unit 28 is decreased, a time threshold until the light is turned off, and a time threshold until the power supply is turned off in a case where the display unit 28 is at the face-to-face position and is in the shooting standby state. The time threshold T1 is set as t4 (>t1), the time threshold T2 is set as t5 (>t2), and the time threshold T3 is set as t6 (>t3). The values set as the time thresholds T1 to T3 are set to satisfy a relationship of t4<t5<t6. Any of the time thresholds in the case of the face-to-face position is set to be longer than the time threshold set in S306. That is, during the shooting standby, the time threshold is set such that it takes longer to establish the power saving state in a case where the display unit 28 is at the face-to-face position as compared with the case where the display unit 28 is stored. When the time threshold is set as described above, in a case where the user sets the display unit 28 at the face-to-face position in the self-shooting mode or the like, a situation is avoided where the operability is decreased by performing the operation a number of times not to turn off the display of the display unit 28.

In S308, the system control unit 50 determines whether or not the non-operation time Ts exceeds the time threshold T3 set in S306 or S307. When it is determined that the non-operation time Ts exceeds the time threshold T3 (for a constant period or a predetermined period), the flow proceeds to S309. When it is determined that the non-operation time Ts does not exceed the time threshold T3, the flow proceeds to S310.

In S309, the system control unit 50 turns off the power supply of the digital camera 100 to end the display unit operation processing.

In S310, the system control unit 50 determines whether or not the non-operation time Ts exceeds the time threshold T2 set in S306 or S307. When it is determined that the non-operation time Ts exceeds the time threshold T2, the flow proceeds to S311. When it is determined that the non-operation time Ts does not exceed the time threshold T2, the flow proceeds to S319.

In S311, the system control unit 50 determines whether or not the power supply of the display unit 28 is ON and the light is currently turned off. When it is determined that the light of the display unit 28 is currently turned off, the flow proceeds to S313. When it is determined that the light of the display unit 28 is not currently turned off, the flow proceeds to S312.

In S312, the system control unit 50 turns off the light of the display unit 28. At this time, the measurement of the non-operation time Ts which has been started in S303 is not stopped (reset), and the measurement continues. FIG. 4C illustrates the display unit 28 where the light is turned off, and the live view image is not displayed. It should be noted however that the light of the display unit 28 is turned off, while the power supply of the digital camera 100 remains ON.

In S313, the system control unit 50 determines whether or not the touch operation of the display unit 28 and the touch panel 70a is performed. When it is determined that the touch operation is performed, the flow proceeds to S314. When it is determined that the touch operation is not performed, the flow proceeds to S318.

In S314, the system control unit 50 determines whether or not the display unit 28 is at the face-to-face position. When the display unit 28 is at the face-to-face position, the flow proceeds to S315. When the display unit 28 is not at the face-to-face position, the flow proceeds to S317.

In S315, the system control unit 50 performs processing of returning to the original state from the power saving state and the state in which the operation in accordance with the touch operation is not performed when the state is established in which the light of the display unit 28 is turned off. It should be noted that the operation at this time (the touch determined in S313 or the button operation determined in S318) is used only for the returning processing, and the function allocated at the time of the normal state is not executed.

In S316, the system control unit 50 turns on the light of the display unit 28. At this time, the state is changed from the state in which the light of the display unit 28 is turned off as illustrated in FIG. 4C to the state in which the light is turned on as illustrated in FIG. 4A, and the function in accordance with the touch operation is also executed. When it is determined that the state is returned as described above, the light of the display unit 28 is turned on, and the luminance also becomes the luminance A=α corresponding to the luminance in the normal state, so that the state in which the operation in accordance with the power saving state or the touch operation is not performed (touch acceptance OFF) is no longer established.

In S317, the system control unit 50 determines that the original state is not returned while the state in which the operation in accordance with the power saving state or the touch operation is not performed is kept when the state is established in which the light of the display unit 28 is turned off. Then, the flow proceeds to S308, and the measurement of the non-operation time continues. In this manner, as illustrated in S314 to S316, when the touch operation is performed in a case where the light of the display unit 28 is turned off, it is determined whether or not the display unit 28 is at the face-to-face position. When the display unit 28 is at the face-to-face position, since it is difficult to perform the operation of the member by the operation unit 70 or the like, the state can be easily returned by the touch operation. On the other hand, when the display unit 28 is not at the face-to-face position, since the user may wear the digital camera 100 around the neck or the like in some cases, the state is not returned by the touch operation so that the erroneous operation is unlikely to be performed.

In S318, the system control unit 50 determines whether or not the operation of the button or the dial is performed like the cross key 66, the set button 65, the shutter button 61, and the like included in the operation unit 70 corresponding to the operation unit that does not include the touch panel 70a. When it is determined that the operation of the button or the dial is performed, the flow proceeds to S315. When it is determined that the operation of the button or the dial is not performed, the flow proceeds to S308, and the measurement of the non-operation time continues.

In S319, the system control unit 50 determines whether or not the non-operation time Ts exceeds the time threshold T1 set in S306 or S307. When it is determined that the non-operation time Ts exceeds the time threshold T1, the flow proceeds to S320. When it is determined that the non-operation time Ts does not exceed the time threshold T1, the flow proceeds to S321.

In S320, the system control unit 50 decreases the luminance of the display unit 28 from the luminance A=α to the luminance A=β. FIG. 4B illustrates a display example of the display unit 28 in the case of the luminance A=β. Although the live view image 401 is displayed, since the luminance is decreased, the screen is dark, and the visibility of the live view image is decreased. It should be noted however that the power consumption at this time is lower than that in the case of the luminance A=α. In addition, in a case where the touch operation is performed at this time, the function in accordance with the performed touch operation is executed.

In S321, the system control unit 50 determines whether or not the operation of the digital camera 100 is performed. When it is determined that the digital camera 100 is performed, the flow proceeds to S322. When it is determined that the digital camera 100 is not performed, the flow proceeds to S308, and the measurement of the non-operation time continues.

In S322, the system control unit 50 determines whether or not the luminance of the display unit 28 is the luminance A=β, and the state is established in which the luminance is decreased. When it is determined that the luminance is decreased, the flow proceeds to S324. When it is determined that the luminance is not decreased, the flow proceeds to S325.

In S323, the system control unit 50 increases the luminance of the display unit 28 from the luminance A=β to the luminance A=α (returning to the original luminance). In this manner, when the operation is performed, the luminance that has been decreased in the power saving state returns to the luminance in the normal state.

In S324, the system control unit 50 determines whether or not the operation determined in S321 is the touch operation on the display unit 28 and the touch panel 70a. When it is determined that the operation is the touch operation, the flow proceeds to S325. When it is determined that the operation is not the touch operation, the flow proceeds to S328.

In S325, the system control unit 50 determines whether or not the area touched in S324 is a function corresponding area. The function corresponding area refers to an area where a display item 402 illustrated in FIGS. 4A and 4B is displayed or the like and an area where an item corresponding to the display item 402 is selected in response to the touch. The function corresponding area is not necessarily the area where the display item is displayed, and may be an area where the corresponding function is executed in response to the touch operation being performed. In a case where a function corresponding to a predetermined touch operation on a predetermined area exists, it is also determined whether or not the performed touch operation is an operation corresponding to the function. When it is determined that the area is the function corresponding area, the flow proceeds to S326. When it is determined that the area is not the function corresponding area, the flow proceeds to S327.

In S326, the system control unit 50 executes the function corresponding to the touch detected in S321 and S324. The display item 402 is an item indicating a scene mode. When the display item 402 is touched, the screen is shifted to a screen for selecting a value of an ISO speed rating, and it is possible to perform a setting operation of the ISO speed rating. At this time, when a subject corresponding to part of the live view image displayed on the display unit 28 is touched, autofocus (AF) with respect to the touched subject or shooting while focusing on the touched subject may be performed.

In S327, the system control unit 50 determines whether or not the display unit 28 is at the face-to-face position. In a case where the display unit 28 is at the face-to-face position, the flow proceeds to S302, and the measurement of the non-operation time Ts is reset (Ts=0). In a case where the display unit 28 is not at the face-to-face position, the flow proceeds to S308, and the measurement of the non-operation time continues.

In S328, the system control unit 50 determines whether or not the operation determined in S321 is the operation of the button, the dial, or the like. The button operation refers to a press of the cross key 66, the menu button 67, or the shutter button 61 included in the operation unit 70, and the dial operation refers to a rotation operation of the dial 69. When it is determined that the button operation has been performed, the flow proceeds to S329. When it is determined that the button operation has been not performed, the flow proceeds to S308, and the measurement of the non-operation time continues.

In S329, the system control unit 50 executes the function corresponding to the operation of the button, the dial, or the like detected in S321 and S328.

As described above, even in a case where it is difficult to perform the operation while the display unit 28 is inverted to be at the face-to-face position or a case where the time during which the operation has not been performed is long as in the self-shooting mode, the state is less likely to be shifted to the power saving state according to the described exemplary embodiment. In addition, since the time until the state is shifted to the power saving state is longer, even in a state in which the display unit is at the face-to-face position and the operation is difficult to perform, the operation of returning the state from the power saving state to the normal state or the operation of extending the time until the state is shifted to the power saving state does not need to be performed a number of times. Thus, the desired operation such as the shooting preparation is hardly interrupted while the user performs the operation such that the state is not shifted to the power saving state or the state is returned to the normal state, and the operability is improved. In addition, in a case where the display unit 28 is not at the face-to-face position, since the time threshold for shifting the state to the power saving state remains the same as the normal time, the state is shifted to the power saving state at a shorter time and power saving can be realized.

The time threshold is increased in a case where the display unit 28 is at the face-to-face position in the shooting standby state, but the time threshold is not increased during the display of the reproduction screen or the display of the menu screen while the state is not the shooting standby state.

It should be noted that, even when it is not determined whether or not the position of the display unit 28 is at the face-to-face position, in a case where the mode is switched to the self-shooting mode, the time threshold until the state is shifted to the power saving state may be set to be longer such that the state is less likely to be shifted to the power saving state. Since it takes time to perform the shooting preparation irrespective of the position of the display unit 28 in a case where the self-shooting mode is set, when the time threshold is set to be long, the state is less likely to be shifted to the power saving state, and the shooting is facilitated.

Moreover, the time threshold until the state is shifted to the power saving state may be set on the basis of not only the setting of the shooting mode or the position of the display unit 28 but also whether or not the image pickup apparatus is in the shooting standby state in which the live view image (picked-up image) is displayed. That is, the time threshold in a case where the live view image is displayed on the display unit 28 is set to be longer than that in a case where the live view image is not displayed. When the time threshold is set to be long during the shooting standby as described above, the state is less likely to be shifted to the power saving state during the shooting preparation in the shooting where the shooting preparation takes time. Even when the time threshold is set to be longer than that in other cases such as a case where the mode is the above-described self-shooting mode and a case where the position of the display unit 28 is inverted, the time threshold may be further set to be longer during the shooting standby than that during a period other than the shooting standby period.

Furthermore, according to the described exemplary embodiment, when the light of the display unit 28 is turned off to switch to a touch acceptance OFF state, in a case where the display unit 28 (including the touch panel 70a) is at the face-to-face position, the light of the display unit 28 is turned on, and the state is returned to a touch acceptance ON state in the touch operation. On the other hand, in a case where the display unit 28 is not at the face-to-face position, the light of the display unit 28 is not turned on, and also the touch acceptance ON state is not established in the touch operation. Thus, in a case where the user simply performs the setting change or the shooting instruction by the touch operation by inverting the display unit 28 in the self-shooting or the like, since the state is easily returned to the state in which the touch is accepted even after the touch acceptance OFF state for avoiding the erroneous operation is established, the operability is not decreased. In addition, since the light of the display unit 28 is easily turned on by the touch operation, it is possible to simply display the live view image without pressing the operation unit 70 during the shooting such as the self-shooting. Moreover, in a case where the user wears the camera around the neck or the like without inverting the display unit 28, since the light of the display unit 28 is not turned on by the touch operation from the light OFF state (the touch acceptance OFF state is not switched to the ON state), the function is hardly executed by the touch operation unintended by the user. In this manner, the configuration is changed as to whether or not the state is returned by the touch operation from the state in which the light is off in response to whether or not the display unit 28 is at the face-to-face position, and it is facilitated to easily perform the instruction of the function execution by the touch operation. On the other hand, in a case where the touch operation unintended by the user likely occurs, the erroneous operation is likely to be avoided. Thus, while the operability of the touch operation is improved, the function is unlikely to be executed in response to the touch operation unintended by the user.

It should be noted that a configuration may be adopted in which the user can set whether or not the switching to the power saving state is performed and furthermore the user can set the time threshold until the power saving state enters. In a case where the user sets the time thresholds (t1, t2, and t3) until the power saving state enters, the values of t4, t5, and t6 may also be respectively longer than the values of t1, t2, and t3. Alternatively, a configuration may be adopted in which the user can respectively set t4, t5, and t6 to be longer than t1, t2, and t3.

It should be noted that, according to the present exemplary embodiment, in a case where the display unit 28 is at the face-to-face position, the time threshold until the power saving function is executed is set to be longer or the state is returned by the touch operation, but the configuration is not limited to this. The above-described setting may be adopted in a case where a sub camera that is not illustrated in the drawing is used, a case where a remote manipulation by a remote controller is accepted, or the like.

In a case where image pickup by the sub camera (or also referred to as an in-camera) can be performed, an image pickup direction of the sub camera is the same direction as the direction of the display unit 28. A picked-up image of an image pickup unit selected from among a plurality of image pickup units including a main image pickup unit (equivalent to the image pickup unit 22 illustrated in FIGS. 1C and 1D) having the image pickup direction corresponding to the different direction from the direction of the display unit 28 and image pickup units of other digital cameras can be displayed on the display unit 28, and the image pickup unit that performs the shooting (image pickup unit setting) can be selected. In a case where the sub camera having the image pickup direction that is the same direction as the display direction of the display unit 28 exists, since the sub camera faces in a different direction from the direction of the main camera, even when the display unit 28 is not movable to the face-to-face position with respect to the image pickup unit, the face-to-face position can be established by switching the sub camera and the main camera. That is, in a case where the in-camera is used, the time until the power saving state enters can be set to be longer than that in a case where the main camera (or the other image pickup unit) is used, and furthermore, in a case where the in-camera is used, the state in which the light of the display unit 28 is turned off can be returned to the normal state by the touch operation. While the time threshold until the power saving state enters in a case where the in-camera is used is set to be longer than the time threshold until the power saving state enters in a case where the in-camera is not used, since the power saving state unlikely enters, it is facilitated to perform the shooting such as the self-shooting.

In a case where the remote manipulation by the remote controller is performed too, the operation of the operation unit 70 or the like is not performed, but the user may perform the operation of the digital camera 100. Therefore, the threshold until switching to the power saving state is performed may be set to be long. Whether or not the acceptance state for the instruction by the remote controller (a remote control instruction mode by the remote controller for performing the shooting instruction or the like) is established is determined by detecting whether or not a cable for performing the remote manipulation such as a remote control cable is inserted to the digital camera 100. Alternatively, the determination may be performed by detecting whether or not the setting for accepting the remote manipulation is performed or whether or not insertion to tripod holes is performed, or the remote control instruction may be accepted in response to the setting of the self-shooting mode. In a case where the insertion to the tripod holes is performed, the user is likely to perform shooting to take a photograph without blurring by using the tripod. For this reason, the user is more likely to perform the remote manipulation than to operate the digital camera 100 itself. Thus, the shooting instruction, the setting, and the like are likely to be performed by the remote manipulation in the shooting using the tripod, and the threshold until switching to the power saving state is performed may be set to be longer so that switching to the power saving mode is unlikely to occur.

According to the present exemplary embodiment, the descriptions have been given of the configuration to set the time threshold to be long in a case where the display unit 28 is at the face-to-face position and furthermore the shooting standby state is established, but the state does not necessarily need to be the shooting standby state, and when the display unit 28 is at the face-to-face position, the time threshold may be set to be long.

Since the user takes time to perform the shooting preparation irrespective of the position of the display unit 28 in a case where the self-shooting mode is set among the plurality of shooting modes that can be set, the time threshold until the power saving state enters may be set to be long. Alternatively, the condition where the threshold until switching to the power saving state is performed is set to be long when the self-shooting mode is set and furthermore in response to the display unit 28 being positioned at the face-to-face position while the above-described conditions may be combined with each other.

It should be noted that, according to the present exemplary embodiment, the descriptions have been given of the configuration in which the light of the display unit 28 is turned off (touch acceptance OFF) in response to the non-operation time Ts having elapsed the time threshold T2, but a configuration may be adopted in which switching to the touch acceptance OFF state is not performed when the display unit 28 is at the face-to-face position.

In addition, according to the present exemplary embodiment, the descriptions have been given of the configuration in which the function in accordance with the touch operation on the touch panel 70a is not executed in a case where the light of the display unit 28 is turned off, but a configuration may be adopted in which the function is not executed in response to the touch operation having a predetermined touch area size or larger touch area size. That is, the function in accordance with the touch operation is executed irrespective of the touch area size of the touch operation that is performed in a case where the light is not turned off. On the other hand, the touch area size having a large value corresponds to the touch operation unintended by the user in a case where the light is turned off. Therefore, the function in accordance with the touch operation is not executed, and the function is executed in response to the touch operation having a touch area size that is smaller than a threshold touch area size.

It should be noted that, according to the present exemplary embodiment, the descriptions have been given of the self-shooting as the example in which the display unit 28 is inverted, but the configuration is not limited to this. In a case where the shooting is performed from the foot of the user (low angle) or above the head (high angle) too, the display direction of the display unit 28 is changed. For example, when the shooting is performed from the foot, it is possible to shoot a subject in a wider range. At this time, the display direction of the display unit 28 faces the direction of the user, and the image pickup direction of the image pickup unit 22 faces a subject other than the user. In the above-described case too, the time threshold until the power saving state enters is set to be long, the user does not need to perform the operation for cancelling the power saving state a number of times in a situation where it is difficult to operate the operation unit 70. In the above-described case too, when the state in which the display is turned off can be cancelled by the touch operation, the display can be easily turned on from the state in which the display of the display unit 28 is turned off even in a situation where it is difficult to operate the operation unit 70.

It should be noted that the control of the digital camera 100 may be performed by single hardware, or the control of the entire apparatus may be performed while the processings are performed by plural pieces of hardware in a shared manner.

Aspects of the present invention have been described in detail by way of the exemplary embodiments, but the aspects of the present invention are not limited to these particular exemplary embodiments, and various modes within a range without departing from the scope of the aspects of the present invention are also included. The above-described respective exemplary embodiments can be appropriately combined with each other.

According to the above-described exemplary embodiments, while aspects of the present invention have been described with respect to a digital camera, the aspects of the invention are not limited to this example. Aspects of the present invention can be applied to an image pickup apparatus including a display unit that can be rotated with respect to a main body unit and the following described image pickup apparatus. Aspects of the present invention can be applied to an image pickup apparatus that can be set to be in the self-shooting mode from a plurality of shooting modes including a self-shooting mode and the image pickup apparatus that can perform the setting such that shooting is performed by one of a plurality of image pickup units including an image pickup unit having a different direction from the image pickup unit having the image pickup direction that is the same direction as the display direction of the display unit. Alternatively, aspects of the present invention can be applied to an apparatus including a touch panel that can change a positional relationship with the image pickup unit or a touch panel that can be inverted with respect to the main body unit and the like. That is, aspects of the present invention can be applied to a mobile phone terminal provided with a camera, a portable image viewer, a touch pad, a music player, a game player, an electronic book reader, and the like.

Other Embodiments

Aspects of the present invention can be realized by executing the following processing. That is, software (program) that realizes the function of the above-described exemplary embodiment is supplied to a system or an apparatus via a network or various recording medium, and a computer (or a CPU, an MPU, or the like) of the system or the apparatus reads out and executes a program code for the processing. In this case, the program and the recording medium that stores the program constitute aspects of the present invention.

According to the exemplary embodiments of the present invention, the power saving state and the non-power saving state can be switched at a satisfactory operability.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

What is claimed is:

1. An image pickup apparatus comprising at least one memory and at least one processor which function as:
    an accepting unit configured to accept an operation from a user;
    a setting unit configured to set a shooting mode from among a plurality of shooting modes including a self-shooting mode in which a photographer who instructs shooting is a subject; and a control unit configured to perform control such that a power saving function of reducing power consumption is executed and a power saving mode is entered in response to the accepting unit not accepting the operation from the user for a first period in a first state in a case where the shooting mode set by the setting unit is a shooting mode other than the self-shooting mode, and that the power saving function is not executed in response to the accepting unit not accepting the operation from the user for the first period in the first state in a case where the shooting mode set by the setting unit is the self-shooting mode, wherein the control unit is configured to perform control not to enter the first state in response to a touch operation to a display unit when the image pickup apparatus is in the power saving mode in a case where the shooting mode other than the self-shooting mode is set, and to enter the first state in response to a touch operation to the display unit when the image pickup apparatus is in the power saving mode in a case where the self-shooting mode is set.

2. The image pickup apparatus according to claim 1, wherein the control unit performs the control such that shooting is performed in response to a shooting instruction by the touch operation on the display unit in a case where the shooting mode is set as the self-shooting mode by the setting unit.

3. The image pickup apparatus according to claim 1, wherein a shooting instruction by a remote controller is accepted in the self-shooting mode.

4. The image pickup apparatus according to claim 1, wherein a predetermined effect is applied to a human face area in the self-shooting mode.

5. The image pickup apparatus according to claim 1, wherein the control unit is configured to perform control such that the power saving function of reducing power consumption is executed in response to the accepting unit not accepting the operation from the user for a second period longer than the first period in a case where the shooting mode set by the setting unit is the self-shooting mode.

6. The image pickup apparatus according to claim 1, wherein the accepting unit is configured to further accept a user operation for a button or a dial, and
wherein the photographer is not on a side of the accepting unit when the self-shooting mode and the photographer is on the side of the accepting unit when the shooting mode is other than the self-shooting mode.

7. An image pickup apparatus comprising at least one memory and at least one processor which function as:
an accepting unit configured to accept an operation from a user;
a setting unit that can perform setting on at least one image pickup unit that performs shooting from among a plurality of image pickup units including a first image pickup unit configured to shoot an operator and a second image pickup unit having an image pickup direction that is an opposite direction to an image pickup direction of the first image pickup unit; and
a control unit configured to perform control such that a power saving function of reducing power consumption is executed and a power saving mode is entered in response to the accepting unit not accepting the operation from the user for a first period in a first state in a case where the setting unit does not set to cause the first image pickup unit to perform the shooting, and that the power saving function is not executed in response to the accepting unit not accepting the operation from the user for the first period in the first state in a case where the setting unit sets to cause the first image pickup unit to perform the shooting, wherein the control unit is configured to perform control not to enter the first state in response to a touch operation to a display unit when the image pickup apparatus is in the power saving mode in a case where the setting unit does not set to cause the first image pickup unit to perform the shooting, and to enter the first state in response to a touch operation to the display unit when the image pickup apparatus is in the power saving mode in a case where the setting unit sets to cause the first image pickup unit to perform the shooting.

8. The image pickup apparatus according to claim 7, wherein the control unit is configured to perform the control such that a power saving function of reducing power consumption is executed in response to the accepting unit not accepting the operation from the user for a second period longer than the first period in a case where the setting unit does not set to cause the first image pickup unit to perform the shooting.

9. The image pickup apparatus according to claim 7, wherein the control unit performs the control such that the shooting is performed in response to a shooting instruction by the touch operation on the display unit in a case where the setting unit sets to cause the first image pickup unit to perform the shooting.

10. The image pickup apparatus according to claim 7, wherein the accepting unit is configured to further accept a user operation for a button or a dial,
wherein the first image pickup unit is on a side of the accepting unit.

11. A control method for an image pickup apparatus, the control method comprising:
accepting an operation from a user;
setting a shooting mode from among a plurality of shooting modes including a self-shooting mode in which a photographer who instructs shooting is a subject; and
performing control such that a power saving function of reducing power consumption is executed and a power saving mode is entered in response to the operation from the user not being accepted for a first period in a first state in a case where the shooting mode set in the setting is a shooting mode other than the self-shooting mode, and that the power saving function is executed in response to the operation from the user not being accepted for a second period that is longer than the first period in the first state in a case where the shooting mode set in the setting is the self-shooting mode, wherein performing control comprises performing control not to enter the first state in response to a touch operation to a display unit when the image pickup apparatus is in the power saving mode in a case where the shooting mode other than the self-shooting mode is set, and to enter the first state in response to a touch operation to the display unit when the image pickup apparatus is in the power saving mode in a case where the self-shooting mode is set.

12. A control method for an image pickup apparatus, the control method comprising:
accepting an operation from a user;
performing setting on at least one image pickup unit that performs shooting from among a plurality of image pickup units including a first image pickup unit configured to shoot an operator and a second image pickup unit having an image pickup direction that is an opposite direction to an image pickup direction of the first image pickup unit; and performing control such that a power saving function of reducing power consumption is executed and a power saving mode is entered in response to the operation from the user not being accepted for a first period in a first state in a case where the first image pickup unit is not caused to perform the shooting in the setting, and that the power saving function is not executed in response to the operation from the user not being accepted for the first period in the first state in a case where the first image pickup unit is caused to perform the shooting, wherein performing control comprises performing control not to enter the first state in response to a touch operation to a display unit when the image pickup apparatus is in the power saving mode in a case where the setting unit does not set to cause the first image pickup unit to perform the shooting, and to enter the first state in response to a touch operation to the display unit when the image pickup apparatus is in the power saving mode in a case where the setting unit sets to cause the first image pickup unit to perform the shooting.

13. A non-transitory computer-readable storage medium that stores a program for executing the method according to claim 11.

14. A non-transitory computer-readable storage medium that stores a program for executing the method according to claim 12.

* * * * *